United States Patent

Pofferi

[15] 3,686,805

[45] Aug. 29, 1972

[54] ASSEMBLIES FOR MOUNTING PANELS ON WALLS

[72] Inventor: Giancarlo Pofferi, Pistoia, Italy

[73] Assignee: Ital-Bed Costruzione Letti e Affini S.r.l., Pistoia, Italy

[22] Filed: March 20, 1970

[21] Appl. No.: 21,517

[52] U.S. Cl. ..........................52/64, 52/220, 52/483, 52/506

[51] Int. Cl. ............................E04c 2/52, E04f 17/08

[58] Field of Search........52/479, 220, 506, 508, 511, 52/512, 481, 483, 64; 108/48, 38, 40

[56] References Cited

UNITED STATES PATENTS 2,186,458 1/1940 Lehman.......................52/710

2,496,910 2/1950 Fridolph......................52/716

3,042,978 7/1962 Eames...........................52/64

FOREIGN PATENTS OR APPLICATIONS 630,645 12/1961 Italy.............................52/220

*Primary Examiner*—Price C. Faw, Jr.

*Attorney*—Polachek, Saulsbury & Hough

[57] ABSTRACT

A wall-mounted panel assembly is formed by two elongated trunking members for carrying electrical conductors or fluid conduits and the like, which are mounted on the wall to lie horizontally and in vertically spaced relationship. A panel is then secured to span both trunking members.

2 Claims, 4 Drawing Figures

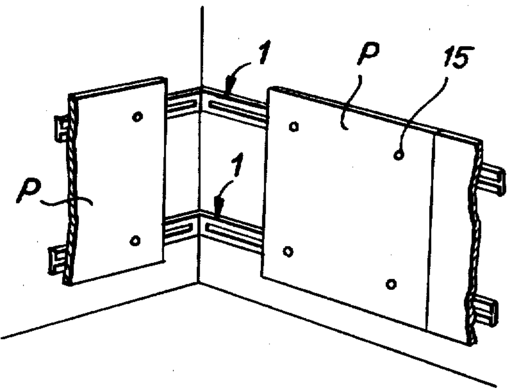
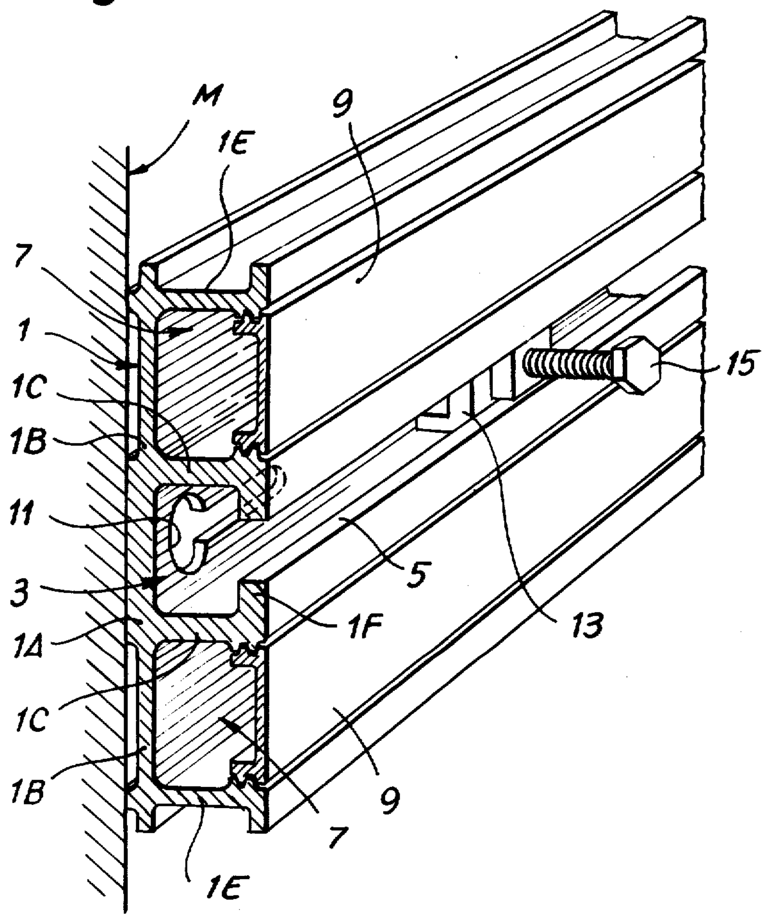
INVENTOR:
GIANCARLO POFFERI
By Polachek & Saulsbury
ATTORNEYS.

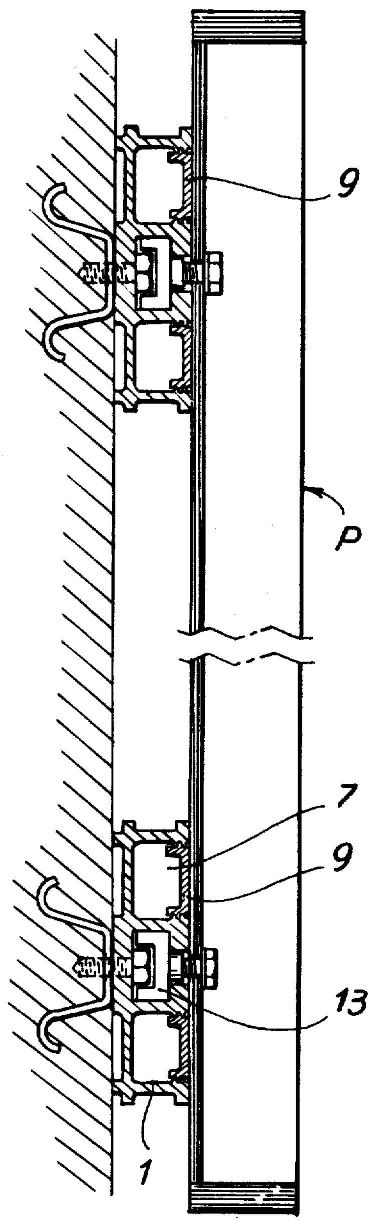
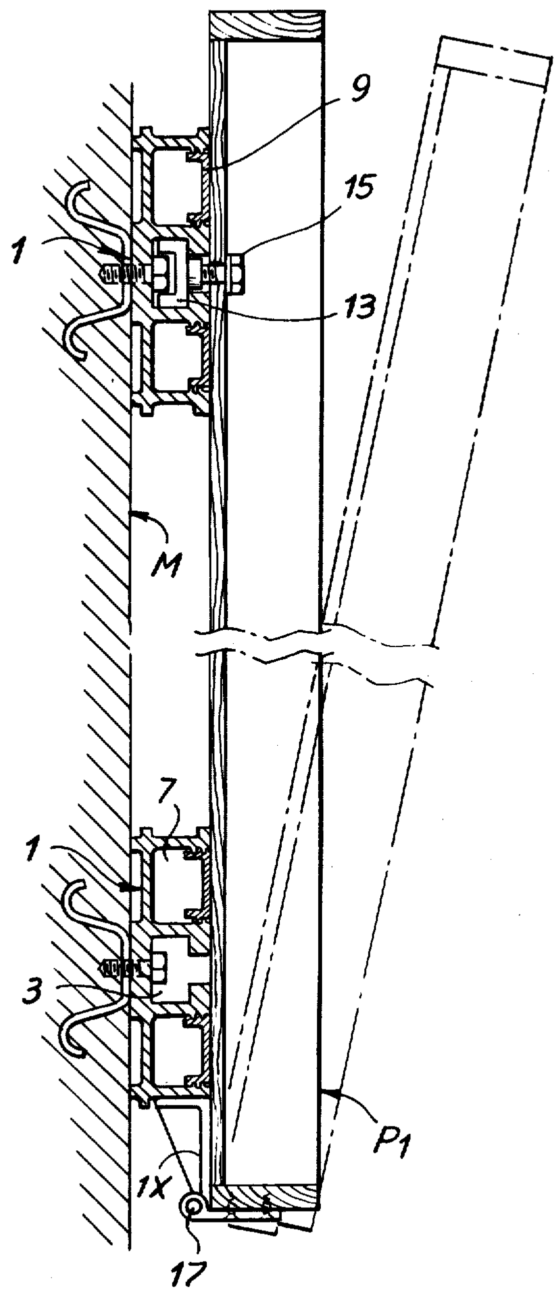
INVENTOR:
GIANCARLO POFFERI
BY Polachek & Saulsbury
ATTORNEYS

ASSEMBLIES FOR MOUNTING PANELS ON WALLS

The present invention relates to assemblies for mounting panels on walls.

An object of the invention is to provide an assembly which has the dual role of carrying electrical conductors, fluid conduits and the like as well as providing a support for panels and the like to be mounted on a wall.

A further object of the invention is to provide an assembly to which panels can be secured in any position along the length of the assembly.

SUMMARY OF THE INVENTION

The present invention provides a wall mounted panel assembly comprising a first and a second elongated trunking member mounted on the wall in substantially parallel spaced relationship, and a panel mounted on said first and second elongated trunking members.

BRIEF DESCRIPTION OF THE DRAWINGS

FIG. 1 is a perspective view of the assembly;

FIG. 2 is a perspective view of a channel or section applied on to a wall, without a panel;

FIG. 3 is a vertical section with two channels or sections applied on to the wall and bearing a panel; and FIG. 4 shows modification of FIG. 3.

DESCRIPTION OF THE PREFERRED EMBODIMENT

As shown in FIG. 1 removable panels P are secured to a wall by means of sections or channels 1 mounted horizontally on the wall and which also carry conduits and other facilities. Each channel or section 1 has a central wall abutting portion 1A, two lateral portions 1B, two intermediate walls 1C lying perpendicular to the portion 1A, and two end walls 1E perpendicular to the lateral portions 1B. The wall abutting portion 1A, and the intermediate walls 1C define a longitudinal recess 3 the open side of which is partially closed by two lips 1F extending inwardly from respective walls 1C and which define a longitudinal slot 5. Each lateral portion 1B together with corresponding walls 1C and 1E define a longitudinal recess 7 which recess can be closed by a cover 9.

The channels or sections 1 are mounted on a wall M, which can be a brick wall, in any suitable manner, for example, the channels are advantageously provided with shaped slots 11, made in the portion 1A and through which bolts or for other fixing means mounted on the wall can extend and by means of which the channels can be moved into locking engagement with the wall.

As shown in FIG. 1 two channels 1 are mounted horizontally on the wall and are appropriately spaced apart. The channels are arranged to support panels P, linings or useful loads, for example furniture, shelves or the like.

The channels or sections 1 with their recesses 7 serve also as trunking for the installation of electric mains, other electrical facilities, fluid distribution services, and the like. The channel 3 may also serve as trunking. The channel 3 can, however, be used partly for mounting the panels P on the channels 1. To this end slidable blocks 13 are inserted into the channels 3. The blocks 13 carry screw-threaded bores which are arranged to receive panel mounting bolts 15.

In the modification shown in FIG. 4, the same channels 1 are mounted on the wall M in a similar manner to that shown in FIG. 3. The panels P1 instead of being directly locked to the lower of the channels, are hingedly mounted thereon. The lower channel 1 has extension stirrups 1X which support horizontal pivot pins 17 about which the panels P1 can pivot. The panels P1 are secured to the upper of the two channels 1 by means of pins 15 and slidable blocks 13 as described in conjunction with the FIG. 3 embodiment.

In both embodiments the panels P and P1 can be totally or partially separated from the channels 1 to allow access to the grooves 7 and 3 for inspection of the contents of the grooves for cleaning purposes.

What is claimed is:

1. An assembly for mounting panels on a wall comprising a first elongated trunking member having a first-panel-securing means incorporated thereon, a second elongated trunking member having a second panel-securing means incorporated thereon, means mounting said first and second elongated members in generally parallel spaced relationship on said wall, each said elongated trunking member comprising a wall-abutting portion, a first lateral portion disposed substantially parallel to and extending laterally from said wall-abutting portion on one side thereof, a second lateral portion disposed substantially parallel to and extending laterally from said wall-abutting portion on the other side thereof, a first end wall extending from said first lateral portion and lying perpendicular to said first lateral portion, a second end wall extending from said second lateral portion and lying perpendicular to said second lateral portion, a first intermediate wall extending from the wall-abutting portion adjacent juncture thereof with said first lateral portion and lying perpendicular to said wall-abutting portion, and a second intermediate wall extending from said wall-abutting portion adjacent juncture thereof with said second lateral portion and lying perpendicular to said wall-abutting portion, said first lateral portion, said first intermediate wall, and said first end wall defining a first recess, said second lateral portion, said second intermediate wall, and said second end wall defining a second recess and said first and second intermediate walls and said wall-abutting portion defining a third recess, each intermediate wall being provided with a lip at the edge thereof distally from said wall-abutting portion, said lip projecting into said third recess to partially close the same thereby defining a guide of said first securing means, said first securing means further including a panel-securing member slidable along the recess and a screw bolt carried on the panel-securing member, and a panel secured by at least one of said first and second securing means.

2. An assembly according to claim 1, wherein said first panel-securing means comprises hinge means mounting said panel member pivotably upon one of said elongated trunking members such that when said panel is secured thereto, said panel member is pivotably movable upon the first trunking member and pivotably movable from said second elongated trunking member.

* * * * *